United States Patent [19]

Newman et al.

[11] Patent Number: 5,428,120
[45] Date of Patent: Jun. 27, 1995

[54] PROCESS FOR PREPARATION OF SYNDIOTACTIC VINYLIDENE AROMATIC POLYMERS USING CHAIN TRANSFER AGENT

[75] Inventors: Thomas H. Newman, Midland; Karen K. Borodychuk, Mt. Pleasant, both of Mich.

[73] Assignee: The Dow Chemical Company, Midland, Mich.

[21] Appl. No.: 133,358

[22] Filed: Oct. 8, 1993

[51] Int. Cl.6 .......................... C08F 4/642; C08F 4/52
[52] U.S. Cl. ..................................... 526/160; 526/132; 526/133; 526/151; 526/153; 526/164; 526/293; 526/346
[58] Field of Search ............... 526/132, 133, 160, 164, 526/151, 153, 293, 346

[56] References Cited

U.S. PATENT DOCUMENTS

| | | | |
|---|---|---|---|
| 4,680,353 | 7/1987 | Ishihara et al. | 526/160 |
| 5,066,741 | 11/1991 | Campbell, Jr. | 526/160 X |
| 5,206,197 | 4/1993 | Campbell, Jr. | 526/132 X |
| 5,294,685 | 3/1994 | Watanabe et al. | 526/160 X |
| 5,340,892 | 8/1994 | Kuramoto | 526/119 |

*Primary Examiner*—Fred Teskin

[57] ABSTRACT

A process for preparing syndiotactic vinylidene aromatic polymers comprising contacting one or more vinylidene aromatic monomers with tri n-propyl aluminum chain transfer agent under Ziegler-Natta polymerization conditions.

9 Claims, No Drawings

PROCESS FOR PREPARATION OF SYNDIOTACTIC VINYLIDENE AROMATIC POLYMERS USING CHAIN TRANSFER AGENT

BACKGROUND OF THE INVENTION

The present invention relates to a process for polymerizing vinylidene aromatic monomers, such as styrene, to produce polymers having a high degree of syndiotacticity while controlling molecular weight. Such polymers may be usefully employed in the preparation of solid objects and articles such as a moldings, films, sheets and foamed objects by molding, casting or the like process.

In U.S. Pat. No. 4,680,353 there is disclosed a process for the preparation of polymers of vinylidene aromatic monomers having a stereoregular structure of high syndiotacticity, by the use of certain coordination catalysts. Particularly disclosed were the reaction products of a titanium compound and an organoaluminum compound, especially polymethylaluminoxane.

In U.S. Pat. No. 5,066,741 there are disclosed certain cationic metal compounds formed by reacting a metal complex with ammonium or phosphonium salts of Bronsted acids containing a non-coordinating compatible anion or with cationic oxidizers containing a non-coordinating compatible anion. The complexes are usefully employed as catalysts in the polymerization of polymers of vinylidene aromatic monomers having a stereoregular structure of high syndiotacticity. In addition, this reference teaches that an aluminum alkyl compound may additionally be utilized with the catalysts in order to protect them from deactivation. For the teachings contained therein, the aforementioned U.S. Pat. Nos. 4,680,353 and 5,066,741 are herein incorporated in their entirety by reference thereto.

It is previously known to control molecular weight in a Ziegler-Natta catalyzed coordination polymerization of ethylene and other α-olefins by the use of certain materials known as chain transfer agents. Hydrogen is especially useful in this application. Molecular weight control is desirable to produce lower molecular weight polymers for specific end-uses. In the polymerization of vinylidene aromatic monomers, hydrogen has not proven to be an acceptable chain transfer agent. It would be desirable if an alternative technique for controlling molecular weight in the polymerization of vinylidene aromatic monomers to produce syndiotactic polymers were available.

SUMMARY OF THE INVENTION

According to the present invention there is now provided a process for preparing polymers of vinylidene aromatic monomers having a high degree of syndiotacticity using a chain transfer agent to limit the growth of polymer molecular weight. The process comprises contacting at least one polymerizable vinylidene aromatic monomer under polymerization conditions with tri n-propyl aluminum chain transfer agent.

Suitable catalysts for the present polymerization are those previously known in the art including both cationic metal complexes such as those of U.S. Pat. No. 5,066,741 and alumoxane based catalysts such as those of U.S. Pat. No. 4,680,353. More specifically such catalysts comprise the reaction product of a metal complex corresponding to the formula:

$$Cp_mMX_nX'_p$$

wherein:

Cp is a single $n^5$-cyclopentadienyl or $n^5$-substituted cyclopentadienyl group, the substituted cyclopentadienyl group being optionally also bonded to M through a substituent X as explained hereafter;

M is a metal of Group 4 or the Lanthanide Series of the Periodic Table in the +3 or +4 oxidation state;

X each occurrence is an inert anionic ligand of up to 20 nonhydrogen atoms and optionally one X and Cp are joined together forming the divalent ligand-CpX-;

X' is an inert, neutral donor ligand;

m and p are independently 0 or 1;

n is an integer greater than or equal to 2; and the sum of m and n is equal to the oxidation state of M; and an activating cocatalyst.

DETAILED DESCRIPTION OF THE INVENTION

All reference to the Periodic Table of the Elements herein shall refer to the Periodic Table of the Elements, published and copyrighted by CRC Press, Inc., 1989. Also, any reference to a Group or Series shall be to the Group or Series as reflected in this Periodic Table of the Elements, utilizing the IUPAC system for numbering groups.

As used herein, the term "syndiotactic" refers to polymers having a stereoregular structure of greater than 50 percent syndiotactic of a racemic triad as determined by $^{13}C$ nuclear magnetic resonance spectroscopy. Such polymers may be usefully employed in the preparation of articles and objects (e.g., via compression molding, injection molding or other suitable technique) having an extremely high resistance to deformation due to the effects of temperature.

Illustrative but nonlimiting examples of X include hydrocarbyl, silyl, halo, $NR_2$, $PR_2$, OR, SR, and $BR_2$, wherein R is $C_{1-10}$ hydrocarbyl. Preferably where X and R are hydrocarbyl the same are σ-bonded groups.

Illustrative but nonlimiting examples of X' include ROR, RSR, $NR_3$, $PR_3$, and $C_{2-20}$ olefins or diolefins, wherein R is as previously defined. Such donor ligands are able to form shared electron bonds but not a formal covalent bond with the metal.

By the term "activating cocatalyst" is meant any material able to render the metal complex catalytically active. Suitable activating cocatalysts for use herein include alumoxanes especially methylalumoxane or isopropyl alumoxane as well as cation forming activating cocatalysts such as salts of a Bronsted acid and a non-coordinating compatible anion, salts of an oxidizing cation and a non-coordinating anion, strong Lewis acids such as trispentafluorophenyl borane, or similar activating cocatalyst. Preferred activating cocatalysts comprise cation forming compounds. The resulting cationic catalytic species obtained by the use of such cation forming activating cocatalysts accordingly corresponds to the formula:

$$[Cp_mMX_{n-1}X'_p]^+Z^-$$

wherein Cp, M, X, X' and p are as previously defined, and A- is an inert, non-coordinating, compatible anion.

The term "inert" means noninterfering with the desired catalyst preparation or with the use of the resulting metal complex containing compound as a polymerization catalyst.

The recitation "non-coordinating, compatible anion" means an anion which either does not coordinate with the first component or a derivative thereof; or which is only weakly coordinated to said component thereby remaining sufficiently labile to be displaced by the vinylidene aromatic monomer to be polymerized. The recitation non-coordinating, compatible anion" specifically refers to an anion which when functioning as a charge balancing anion in the catalyst system of this invention does not transfer an anionic substituent or fragment thereof to the cationic portion of the catalyst. Compatible anions are also anions which are not degraded to neutrality under the reaction conditions of the present invention.

Preferred inert, non-coordinating, compatible anions are $BX''_4$ and $XBX''_3$ wherein X is $C_{1-20}$ hydrocarbyl and X'' is pentafluorophenyl. Especially preferred is tetrakispentafluorophenyl borate.

Monocyclopentadienyl and substituted monocyclopentadienyl groups for use according to the present invention are more specifically depicted by the formula:

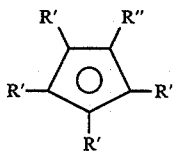

wherein:

R' each occurrence is independently selected from the group consisting of hydrogen, halogen, R, N-R$_2$, P-R$_2$; OR; SR or BR$_2$, wherein R is as previously defined, or one or two pairs of adjacent R' hydrocarbyl groups are joined together forming a fused ring system.

R'' individually may be R' or a divalent X group that is also covalently bonded to M.

Preferably, R' is alkyl or haloalkyl of up to 6 carbons. Most highly preferably Cp is cyclopentadienyl or pentamethylcyclopentadienyl.

Illustrative, but not limiting examples of metal complexes which may be used in the preparation of the compounds of this invention are derivatives of titanium, zirconium, hafnium and lanthanum. Titanium is the preferred metal. A most highly preferred catalyst is formed by reaction of cyclopentadienyl titanium $C_{1-4}$ trialkoxides or pentamethyltitanium $C_{1-4}$ trialkoxides with ammonium tetrakispentafluorophenyl borate.

In a highly preferred embodiment of the present invention Cp is n$^5$-cyclopentadienyl or n$^5$-pentamethylcyclopentadienyl, m is one, M is titanium, n is three, p is zero, X is R or OR, and R is $C_{1-10}$ alkyl, aryl or aralkyl.

The catalyst can be prepared in a suitable solvent at a temperature within the range from about $-100°$ C. to about 300° C. The catalyst system can also form in situ if the components thereof are added directly to the polymerization process and a suitable solvent or diluent, including the monovinylidene aromatic monomer, is used in said polymerization process. It is preferred, however, to form the catalyst in a separate step in a suitable solvent prior to adding the same to the polymerization reactor. The catalyst components are generally sensitive to both moisture and oxygen and should be handled and transferred in an inert atmosphere such as nitrogen, argon or helium.

Suitable solvents or diluents for the catalyst preparation and for the polymerization include any of the solvents known in the prior art including, but not necessarily limited to, straight and branched-chain hydrocarbons such as $C_{6-12}$ alkanes (hexane, heptane, octane and the like); $C_{6-12}$ cyclic and allcyclic hydrocarbons such as cyclohexane, cycloheptane, methylcyclohexane, methylcycloheptane and the like and $C_{6-12}$ aromatic and alkyl-substituted aromatic compounds such as benzene, toluene, xylene, decalin, and the like, and mixtures thereof.

The catalysts may be employed as homogeneous catalysts or supported on the surface of a suitable support such as alumina, silica or a polymer.

The chain transfer agent, tri n-propyl aluminum, is added to the reaction mixture either by incorporation with the vinylaromatic monomer, with the catalyst (wherein the catalyst is separately prepared and added to the reactor) or injected separately into the reactor as the need for chain transfer and molecular weight control is desired.

In the practice of the present invention, suitable vinylidene aromatic monomers include those represented by the formula:

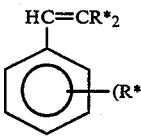

wherein each R* is independently hydrogen; an aliphatic, cycloaliphatic or aromatic hydrocarbon group having from 1 to 10, more suitably from 1 to 6, most suitably from 1 to 4, carbon atoms; or a halogen atom. Examples of such monomers include, styrene, chlorostyrene, n-butylstyrene, p-vinyltoluene, α-methylstyrene, etc., with styrene being especially suitable. Copolymers of styrene and the above vinylidene aromatic monomers other than styrene can also be prepared.

The polymerization may be conducted under slurry, bulk or suspension polymerization conditions or other suitable reaction conditions including solid, powdered reaction conditions. The polymerization can be conducted at temperatures of from 0° C. to 160° C., preferably from 25° C. to 100° C., more preferably from 30° C. to 80° C. for a time sufficient to produce the desired polymer. Typical reaction times are from one minute to 100 hours, preferably from 1 to 10 hours. The optimum reaction time or reactor residence time will vary depending upon the temperature, solvent and other reaction conditions employed. The polymerization can be conducted at subatmospheric pressure as well as superatmospheric pressure, suitably at a pressure within the range of 1 to 500 psig (6.9 kPa–3,400 kPa). The use of ambient or low pressures, e.g., 1–5 psig (6.9–34.5 kPa) is preferred in view of lower capital and equipment costs.

The polymerization may be conducted in the presence of an inert diluent or solvent or in the absence thereof, i.e., in the presence of excess monomer. Examples of suitable diluents or solvents include $C_{6-20}$ aliphatic, cycloaliphatic, aromatic and halogenated aliphatic or aromatic hydrocarbons, as well as mixtures thereof. Preferred diluents comprise the $C_{6-10}$ alkanes, toluene and mixtures thereof. A particularly desirable diluent for the polymerization is iso-octane, iso-nonane or blends thereof such as Isopar-E ®, available from Exxon Chemical Company. Suitable amounts of solvent are employed to provide a monomer concentration from 5 percent to 100 percent by weight.

In addition to the presence of tri n-propyl aluminum used as a chain transfer agent it may be desirable to include an hydrocarbylating agent in admixture with the catalyst, especially when the cocatalyst is one of the previously mentioned cation forming activating cocatalysts requiring a replaceable group on the metal complex and the metal complex is initially lacking in such an easily replaceable group. Easily replaceable groups are good leaving groups, such as hydride or hydrocarbyl groups. Preferred hydrocarbylating agents under such circumstances are $C_{1-4}$ dialkyl zinc compounds and $C_{1-4}$ trialkyl aluminum compounds. Amounts of tri n-propyl aluminum in excess of those required for chain transfer control are the preferred hydrocarbylation agent. Molar amounts of hydrocarbylating agents other than n-propyl aluminum used based on the amount of Group 4 metal complex present are generally from 0.5:1 to 50:1, preferably 5:1 to 30:1.

The molar ratio of the vinylidene aromatic monomer to catalyst (in terms of M) may range from 100:1 to $1 \times 10^{10}:1$, preferably from 1000:1 to $1 \times 10^6:1$. Molar ratios of tri n-propyl aluminum to M preferably are from 0.1:1 to 400:1, more preferably from 5:1 to 300:1, most preferably from 10:1 to 250:1.

As in other similar polymerizations, it is highly desirable that the monomers and solvents employed be of sufficiently high purity that catalyst deactivation does not occur. Any suitable technique for monomer purification such as devolatilization at reduced pressures, contacting with molecular sieves or high surface area alumina, deaeration, may be employed.

Purification of the resulting polymer to remove entrained catalyst may also be desired by the practitioner. Purification of the resulting polymer prepared by the process using a cationic metal complex is much easier than in a process using a large amount of an aluminoxane. Entrained catalyst may generally be identified by residues of ash on pyrolysis of the polymer that are attributable to catalyst metal values. A suitable technique for removing such compounds is by solvent extraction, e.g., extraction utilizing hot, high boiling chlorinated solvents, acids or bases such as caustic followed by filtration.

Having described the invention, the following examples are provided as further illustrative and are not to be construed as limiting. Unless stated to the contrary, all parts and percentages are based on weight.

EXAMPLE 1

All reactions and manipulations were carried out under inert atmosphere in a dry box. Solvent and styrene monomer were purified by sparging with $N_2$ and passing through activated alumina and handled using standard inert atmosphere techniques.

Catalyst solutions were prepared in volumetric flasks using toluene solvent. The required amount of N,N-dimethylanilinium tetrakispentafluorophenyl borate $[C_6H_5N(CH_3)_2H]^+[B(C_6F_5)_4]$, was weighed and added to the flask. Various amounts of 1 molar tri n-propylaluminum solution were then added. The required amount of catalyst, pentamethylcyclopentadienyl titanium trimethoxide, 0.03 M in toluene, was added to this mixture. Toluene was then added to the marker of the volumetric flask. The final concentration of titanium complex and ammonium salt activator was 0.003 molar.

Polymerizations were carried out in septum capped, crimp sealed ampoules. The ampoules were charged with 10 ml of styrene and desired amounts of the chain transfer agent solution. Styrene:tri n-propyl aluminum (TNPA) ratios were 8700:1, 2900:1, 1750:1 and 1250:1. The ampoules were then sealed and equilibrated at 70° C. in a water bath. The desired amount of catalyst solution was added to give molar ratios of styrene:Ti of 175,000:1. The polymerization was quenched by the addition of methanol after four hours polymerization time. Each polymer sample was isolated and dried in order to determine the percent conversion. Molecular weight of the resulting syndiotactic polymer was determined via standard solution viscometry using atactic polystyrene standards.

Results are shown in Table I.

TABLE I

| Run | Molar Ratio Styrene: Chain Transfer Agent | % Conversion | Mw |
|---|---|---|---|
| 1 | 8700:1 | 67 | 525,000 |
| 2 | 2900:1 | 63 | 425,000 |
| 3 | 1750:1 | 61 | 400,000 |
| 4 | 1250:1 | 64 | 300,000 |

The use of tri n-propyl aluminum is seen to be an effective chain transfer agent to limit molecular weight of syndiotactic polystyrene while at the same time not significantly adversely affecting catalyst efficiency.

Comparative 1

The reaction conditions of Example 1 were substantially repeated using triisobutyl aluminum in place of tri n-propyl aluminum. Results are contained in Table II.

TABLE II

| Run | Molar Ratio Styrene: Chain Transfer Agent | % Conversion | Mw |
|---|---|---|---|
| 1 | 8700:1 | 55 | 650,000 |
| 2 | 6300:1 | 65 | 600,000 |
| 3 | 3900:1 | 68 | 500,000 |
| 4 | 1500:1 | 70 | 500,000 |
| 5 | 970:1 | 71 | 500,000 |

The use of triisobutyl aluminum is seen to be ineffective in reducing molecular weight to values less than 500,000.

Comparative 2

The reaction conditions of Example 1 were substantially repeated using triethyl aluminum in place of tri n-propyl aluminum. Results are contained in Table III.

TABLE III

| Run | Molar Ratio Styrene: Chain Transfer Agent | % Conversion | Mw |
|---|---|---|---|
| 1 | 87,000:1 | 56 | 780,000 |
| 2 | 35,000:1 | 55 | 480,000 |
| 3 | 17,500:1 | 53 | 460,000 |
| 4 | 8700:1 | 43 | 380,000 |

The use of triethyl aluminum is seen to reduce molecular weight thereby indicating that the compound is effective as a chain transfer agent, however, it also adversely affects catalyst efficiency, resulting in greater than a 20 percent decrease in monomer conversion, compared to TNPA, when used at levels sufficient to control molecular weight.

Example 2

The reaction conditions of Example 1 were substantially repeated using both tri n-propyl aluminum chain transfer agent and tri isobutyl aluminum alkylating agent. The alkylating agent was added to the catalyst solution before addition to the styrene monomer. The tri n-propyl aluminum was added to the styrene monomer. Polymerizations were conducted for 30 minutes. Results are contained in Table IV.

TABLE IV

| Run | Molar Ratio Styrene:TIBA:TNPA | % Conversion | Mw |
|---|---|---|---|
| 1 | 17,500:3:2 | 27 | 580,000 |
| 2 | 17,500:3:6 | 30 | 480,000 |
| 3 | 17,500:3:10 | 34 | 430,000 |
| 4 | 17,500:3:14 | 34 | 270,000 |

The use of an alkylating agent for formation of the cationic salt derivative of pentamethylcyclopentadienyl titanium trimethoxide is seen to have no detrimental effect on chain transfer performance by the tri n-propyl aluminum,

What is claimed is:

1. A process for preparing syndiotactic polymers of vinylidene aromatic monomers comprising contacting one or more vinylidene aromatic monomers under polymerization conditions with tri n-propyl aluminum and a catalytically effective amount of a catalyst comprising the reaction product of a metal complex corresponding to the formula:

$$Cp_mMX_nX'_p$$

wherein:
 Cp is a single $n^5$-cyclopentadienyl or $n^5$-substituted cyclopentadienyl group, the substituted cyclopentadienyl group being optionally also bonded to M through a substituent X;
 M is a metal of Group 4 or the Lanthanide Series of the Periodic Table in the +3 or +4 oxidation state;
 X in each occurrence is an inert anionic ligand of up to 20 nonhydrogen atoms and optionally X and Cp are joined together forming the divalent ligand -CpX-;
 X' is an inert, neutral donor ligand;
 m and p are independently 0 or 1;
 n is an integer greater than or equal to 2; and
 the sum of m and n is equal to the oxidation state of M; and an activating cocatalyst,
 the molar ratio of tri n-propyl aluminum: M being from 0.1:1 to 400:1.

2. The process according to claim 1 wherein the vinylidene aromatic monomer is represented by the formula:

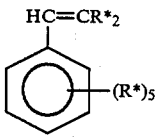

wherein each R* is independently hydrogen; an aliphatic, cycloaliphatic or aromatic hydrocarbon group having from 1 to 10 carbon atoms; or a halogen atom.

3. The process according to claim 2 wherein the vinylidene aromatic monomer is styrene.

4. The process according to claim 1 wherein the catalyst corresponds to the formula:

$$[Cp_mMX_{n-1}X'_p]^+ \, A^-$$

wherein Cp, M, X, X', m, n, and p are as previously defined, and
 A' is an inert, noncoordinating counter ion.

5. The process according to claim 1 wherein M is titanium.

6. The process according to claim 1 wherein Cp is cyclopentadienyl or pentamethylcyclopentadienyl.

7. The process of claim 1 wherein the catalyst is of a pentamethylcyclopentadienyltitanium $C_{1-4}$ tri alkoxide or a cyclopentadienyltitanium $C_{1-4}$ trialkoxide and the activating cocatalyst is a dialkylammoniumtetrakispentafluorophenyl borate.

8. The process of claim 7 wherein the catalyst is pentamethylcyclopentadienyltitanium trimethoxide and the activating cocatalyst is N,N-dimethylanilinium tetrakispentafluorophenyl borate.

9. The process of claim 1 wherein an hydrocarbylating agent other than n-propyl aluminum is present in a molar ratio from 0.5:1 to 50:1 compared to the metal complex.

* * * * *